(12) United States Patent
Huang et al.

(10) Patent No.: US 12,130,183 B2
(45) Date of Patent: Oct. 29, 2024

(54) FIRE-MEASURING DEVICE, METHOD, AND APPLICATION OF ELECTRIC VEHICLES IN GARAGE

(71) Applicant: Shenzhen Polytechnic, Shenzhen (CN)

(72) Inventors: Shenshi Huang, Shenzhen (CN); Ruichao Wei, Shenzhen (CN)

(73) Assignee: SHENZHEN POLYTECHNIC, Shenzhen (CN)

( * ) Notice: Subject to any disclaimer, the term of this patent is extended or adjusted under 35 U.S.C. 154(b) by 149 days.

(21) Appl. No.: 18/084,565

(22) Filed: Dec. 20, 2022

(65) Prior Publication Data

US 2024/0133744 A1 Apr. 25, 2024
US 2024/0230411 A9 Jul. 11, 2024

(30) Foreign Application Priority Data

Oct. 21, 2022 (CN) .......................... 202211290416.2

(51) Int. Cl.
*G01J 5/00* (2022.01)
*G01K 7/04* (2006.01)

(52) U.S. Cl.
CPC .............. *G01J 5/0018* (2013.01); *G01K 7/04* (2013.01)

(58) Field of Classification Search
CPC ................ G01J 5/0018; G01J 5/0066; G01J 2005/0077; G01J 5/48; G01J 5/0003;
(Continued)

(56) References Cited

U.S. PATENT DOCUMENTS

2014/0152445 A1 * 6/2014 Krieg ................... B60L 53/65
340/584
2022/0266578 A1 * 8/2022 Wada ..................... B32B 27/12
(Continued)

FOREIGN PATENT DOCUMENTS

CN 114191746 A * 3/2022 ............... A62C 3/16
CN 115507960 B * 5/2023 ............ G01J 5/0066

OTHER PUBLICATIONS

JGJ100-2015, Code for design of parking garage building, China National Standards, 2015.
(Continued)

*Primary Examiner* — David P Porta
*Assistant Examiner* — Gisselle M Gutierrez
(74) *Attorney, Agent, or Firm* — Bayramoglu Law Offices LLC (57) ABSTRACT

A fire measuring device for electric vehicles in a garage includes a fire parameter acquisition device for collecting fire parameters during the fire evolution process of electric vehicles in the garage, a fire monitoring device for dynamically recording the combustion process, a computer, a charging pile, and a water gun fire extinguishing mechanism. The fire monitoring device communicates with the computer. The fire parameters include heat release rate, temperature, radiation, released gas, and electric vehicle mass change. The invention adopts a fire measuring device for electric vehicles in the garage with the above structure. By measuring the parameters such as heat release rate, temperature, radiation, and released gas type during the firing process, the firing mechanism of the electric vehicle stored in the garage is further analyzed and studied to provide basic data for the technical development of electric vehicle fire safety and provide experimental guidance for personnel training.

9 Claims, 3 Drawing Sheets

(58) Field of Classification Search
CPC . G01K 7/04; G01K 7/02; A62C 37/50; A62C 99/0081; A62C 31/00; Y02T 10/70; G01N 33/0004; H04N 5/33
See application file for complete search history.

(56) References Cited

U.S. PATENT DOCUMENTS

| | | | |
|---|---|---|---|
| 2022/0289923 A1* | 9/2022 | Witzgall | C08K 7/14 |
| 2023/0181956 A1* | 6/2023 | Lee | A62C 37/40 |
| | | | 169/47 |
| 2024/0075330 A1* | 3/2024 | Joester | A62C 3/07 |
| 2024/0189637 A1* | 6/2024 | Shin | A62C 3/07 |

OTHER PUBLICATIONS

JGJ100-2015, Code for design of parking garage building (Draft for Solicitation of Partial Amendments), China National Standards, 2021, pp. 4-13.

* cited by examiner

FIRE-MEASURING DEVICE, METHOD, AND APPLICATION OF ELECTRIC VEHICLES IN GARAGE

CROSS REFERENCE TO THE RELATED APPLICATIONS

This application is based upon and claims priority to Chinese Patent Application No. 202211290416.2 filed on Oct. 21, 2022, the entire contents of which are incorporated herein by reference.

TECHNICAL FIELD

The invention relates to an electric vehicle fire measurement technology in the garage, in particular to a fire measuring device, method, and application of electric vehicles in the garage.

BACKGROUND

With the implementation of the national energy security strategy, the number of electric vehicles in China has grown rapidly in recent years. As of June 2022, the cumulative sales of global electric vehicles have exceeded 20 million, and the electric vehicle market penetration rate has exceeded 21.6% in China, with the inventory exceeding 11 million. Because the lithium battery of electric vehicles has the characteristics of fast burning speed, high risk of reburning, and difficulties of disposal, it is necessary to study its combustion characteristics.

The traditional research on the fire characteristics and fire accidents of electric vehicles only focuses on open space, taking an example of existing technology, the Tianjin Fire Research Institute of the Ministry of Emergency Management has designed an electric vehicle combustion experimental platform and experimental method, which elaborates on the ignition mode of the vehicle and the design of the combustion platform. However, the platform is surrounded by wire mesh, which is not suitable for the garage scene, and the platform does not show and elaborate on the specific measuring points of temperature and the design of the thermocouple bracket.

It can be seen from the above that the design of the vehicle fire test platform is still in its infancy in China. At present, there is still no mechanism to put forward the related technology of electric vehicle fire test in the garage.

Because of the above problems, this patent technology aims to explore the evolution process and mechanism of an electric vehicle fire in the underground garage and provide device and data support for related computational simulation and key technology development.

SUMMARY

The purpose of the invention is to provide a fire-measuring device for an electric vehicle in the garage. By measuring the parameters such as heat release rate, temperature, radiation, and released gas type during the firing process, the firing mechanism of the electric vehicle stored in the garage is further analyzed and studied, thereby providing basic data for the technical development of electric vehicle fire safety and providing experimental guidance for personnel training.

To achieve the above purposes, the invention provides a fire measuring device for electric vehicles in the garage, including a fire parameter acquisition device for collecting fire parameters during the fire evolution process of electric vehicles in the garage, a fire monitoring device for recording the combustion process dynamically, a computer, a charging pile, and a water gun fire extinguishing mechanism, said fire monitoring device communicates with the computer;

The fire parameters include heat release rate, temperature, radiation, released gas, and mass change of the electric vehicle.

The optimal selection of fire parameter acquisition equipment includes a temperature acquisition mechanism around the vehicle, a vehicle radiant heat acquisition mechanism, a vehicle mass acquisition mechanism, and a smoke acquisition mechanism.

Said fire monitoring device comprises a vehicle combustion heat infrared image acquisition mechanism and a vehicle combustion video acquisition mechanism.

Optimal selection of the temperature acquisition mechanism around the vehicle includes:

A temperature acquisition unit for the roof of the vehicle which is installed on the garage sidewall above the vehicle;

An inner-temperature acquisition unit which is installed inside the vehicle;

A temperature acquisition unit for the bottom of the vehicle which is installed on the garage floor under the vehicle;

A temperature acquisition unit for the headstock which is installed on the garage side wall near the headstock;

The temperature acquisition units for the roof and headstock are both length-adjustable structures;

The inter-temperature acquisition unit of the vehicle is a fixed structure;

The temperature acquisition unit for the bottom of the vehicle is a rotating adjustable structure.

Optimal selection of the temperature acquisition units at the roof and headstock of the vehicle both include multiple temperature measurement components arranged vertically and linearly on the side wall of the garage. The temperature measurement components include a telescopic ceramic tube with one end embedded in the inner wall of the garage and a thermocouple pierced through the other end of the telescopic ceramic tube;

The telescopic ceramic tube is arranged with one end of the thermocouple extending toward the center of the electric vehicle in the garage.

The optimal selection of the vehicle's inner temperature acquisition unit includes a fixed bracket and a thermocouple arranged on the seat of the electric vehicle in the garage, the fixed bracket includes a base arranged on the seat and a vertical fixing rod vertically fixed at the top of the base. The vertical fixing rod is provided with a plurality of positioning joints. One end of the horizontal ceramic tube is fixed on the positioning joint, and the other end of the horizontal ceramic tube is connected with a thermocouple.

The optimal selection of the temperature acquisition unit for the bottom of the vehicle comprises a temperature acquisition component in the middle bottom position arranged in a garage ground groove under the vehicle and a bottom side temperature acquisition component arranged symmetrically in a garage ground groove on both sides of the temperature acquisition component in middle bottom position;

The temperature acquisition component in the middle bottom position and the bottom side temperature acquisition component both include a U-shaped bracket with one end connected to the drive motor through the rotating shaft and an extended ceramic tube fixed in the middle of the U-shaped bracket, the drive motor is electrically connected with the switching controller.

The other end of the U-shaped bracket is rotationally connected with the supporting steel groove fixed in the groove.

Optimal selection of the vehicle radiant heat collection mechanism includes radiant heat flow meters arranged on either side of the electric vehicle and both front and rear sides;

The vehicle mass collecting mechanism comprises a mass sensor mat arranged on the garage ground by four tires corresponding to the electric vehicle;

The flue gas collection mechanism includes a flue gas flow rate collection unit and a flue gas component concentration collection unit. The flue gas flow rate collection unit includes gas flow rate sensors arranged on the left and right sides and middle position of the garage ceiling; The smoke component concentration acquisition unit includes a gas analyzer fixed in the roof of the garage;

The vehicle combustion thermal infrared image acquisition mechanism comprises an infrared thermal imager arranged on any side and the front side of the electric vehicle;

The vehicle combustion video acquisition mechanism comprises a high-speed camera arranged on the front side of the electric vehicle.

The method based on the electric vehicle fire measuring device in the garage includes the following steps:

S1, the four mass sensor pads of the vehicle mass acquisition mechanism are placed on the garage floor, the electric vehicle is driven into the garage, and make sure the four tires of the electric vehicle are parked on the corresponding four mass sensor pads; then after determining the experimental conditions, a decision should be made on whether to charge the electric vehicle to a fixed amount of electricity or let the electric vehicle in a charging state according to the experimental conditions;

S2, the telescopic ceramic tubes of the temperature acquisition unit at the roof and headstock of the vehicle are elongated according to the height of the vehicle, and then the height of the ceramic tube of the temperature acquisition unit inside the vehicle on the seat is adjusted according to the position of the measuring point, then the switching controller is used to make the U-shaped bracket at the bottom of the vehicle in a vertical state, and the thermocouple test software is opened to check whether all thermocouples are in normal operation, after replacing the thermocouple in an abnormal state, the newly installed thermocouple is repeatedly detected until all thermocouples are in normal operation and close the thermocouple test software;

S3, adjust the position of the infrared thermal imager, high-speed camera, and radiation heat flow meter respectively according to the position of the vehicle, and then turn on the computer, infrared thermal imager, high-speed camera, radiation heat flow meter, gas flow rate sensor, gas analyzer, and switching controller to check whether each part of the device is in a normal state, and calibrate the sensors that need to be calibrated, and then turn on the test and analysis software that matches each part in the computer to test whether each part is in a normal working state. If it is otherwise debugged and repaired, it will enter the next step.

S4, ignite electric vehicles and record the fire process temperature, infrared images, video images, radiation heat flow, gas flow rate, gas composition, and gas concentration in real-time;

S5, after finishing the test, a water gun fire extinguishing mechanism is used to cool the vehicle body to prevent re-ignition and clear fire residue out of the garage; Recycle the internal temperature collection unit on the vehicle seat for subsequent use; At the same time, the telescopic ceramic tube on the temperature acquisition units of the roof and headstock of the vehicle are contracted back to the interior of the garage wall; Using the opening and closing controller to collect the vehicle bottom temperature acquisition unit in the garage ground groove;

S6. export and analyze the experimental data on the computer, that is, the heat release rate of the electric vehicle is calculated according to the thickness of the flue gas layer recorded by the high-speed camera, the flue gas velocity recorded by the gas flow meter, and the concentration of oxygen, carbon monoxide and carbon dioxide recorded by the gas analyzer; At the same time, the risk of electric vehicles igniting surrounding cars and combustibles can be judged according to the data of radiation heat flow meter, the temperature change of each point in the fire development process and fire process can be judged according to the data of thermocouple and infrared thermal imager.

S7, by changing the fire ignition mode, vehicle type, charging capacity, charging state, and whether using the water gun fire during the fire evolution process, repeat steps S1 to S6 to determine the different scenarios of electric vehicle fire evolution and fire risk.

The optimal selection in step S6, the height of the smoke layer captured by the high-speed camera is defined as h. The flow rates of the left and right sides of the garage ceiling and the middle smoke layer measured by the gas flow meter are $u_1$, $u_2$, and 113, respectively. The oxygen concentration collected by the gas analyzer before the fire is defined as $\dot{X}_{O2}^0$, the real-time concentration of oxygen during the firing process is defined as $\dot{X}_{O2}$. Based on the oxygen consumption method, the heat release rate $\dot{Q}$ during the combustion process of the car is estimated as:

$$\dot{Q} = E \frac{32h(u_1 + u_2 + u_3)\left(\dot{X}_{O2}^0 - \dot{X}_{O2}\right)}{V_m}$$

Whereas the molar volume of oxygen is $V_m$ and E is the heat released per unit mass of oxygen consumed, averaging 13.1 MJ/kg.

Based on the use of an electric vehicle fire measurement device in the garage, it is used for simulation, fire risk assessment, practical engineering guidance, or standard formulation.

Therefore, the invention adopts a fire-measuring device for electric vehicles in the garage with the above-mentioned structure, which can measure fire parameters (heat release rate, temperature, radiation, released gas type, and mass change) in the fire evolution process of the electric vehicle in the garage; at the same time, a heat release rate calculation method is disclosed, which can be used to explore the fire evolution mechanism of new energy vehicle garages, and determine the fire risk evaluation index of new energy vehicle storage place by providing guiding suggestions for effective prevention and control of new energy vehicle fire in storage place, efficient fire extinguishing, personnel evacuation, accident investigation, and other aspects.

The following is a further detailed description of the technical scheme of the invention through drawings and implementation examples.

Among them: 1. Front radiant heat flow meter; 2. Vehicle combustion video capture mechanism; 3. Front infrared thermal imager; 4. Temperature acquisition unit for headstock; 5. Flue gas velocity acquisition unit; 6. Suction pipe; 7. Temperature acquisition unit for the roof of the vehicle; 8. Temperature measurement point for the roof of the vehicle; 9. Charging pile; 10. Rear radiation heat flow meter; 11. Vehicle side infrared thermal imager; 12. Vehicle quality acquisition mechanism; 13. Vehicle side radiation heat flow meter; 14. Inner temperature acquisition unit for the vehicle; 15. Groove; 16. Switching controller; 17. Computer; 18. Water gun fire extinguishing mechanism; 19. Horizontal ceramic tube; 20. Positioning connector; 21. Vertical fixed rod; 22. Seat; 23. Garage floor; 24. Right temperature acquisition component in vehicle bottom; 25. Vehicle temperature measurement point; 26. Temperature acquisition component in middle bottom position; 27. The left side temperature acquisition component in vehicle bottom; 28. Shaft; 29. U-shaped stent; 30. Supporting steel groove; 31. Stick out ceramic tube.

DETAILED DESCRIPTION OF THE EMBODIMENTS

The following will further describe the invention in combination with the attached diagram. It should be noted that this embodiment is based on this technical scheme, and gives a detailed implementation method and specific operation process, but the protection scope of the invention is not limited to this embodiment.

Figure 1:
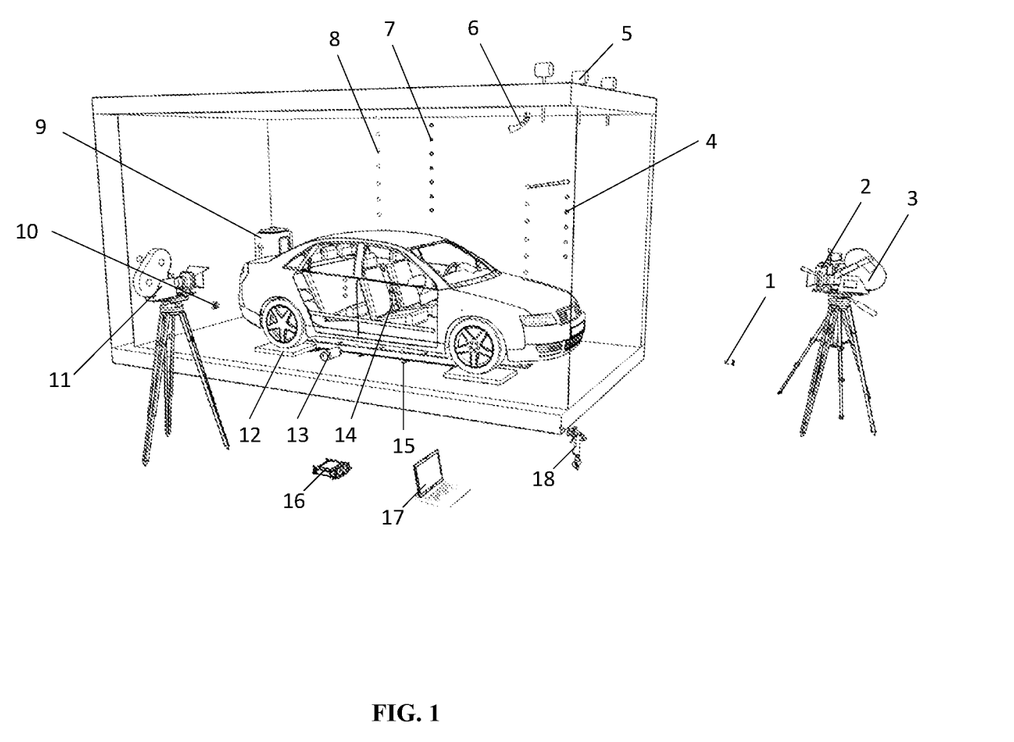
FIG. 1 is the overall structure diagram of the invention.
Figure 2:
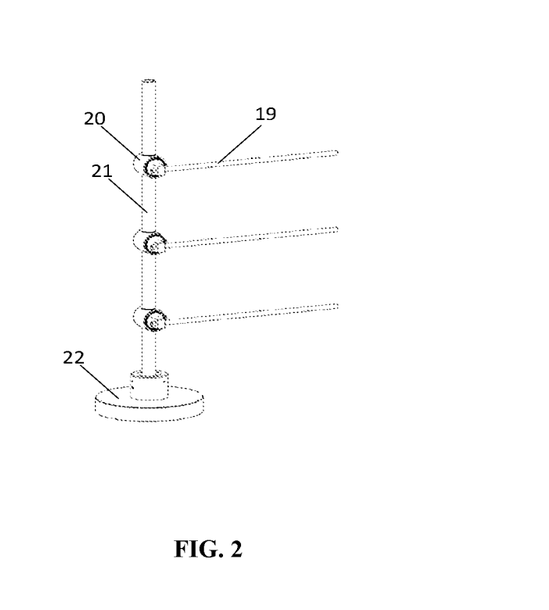
FIG. 2 is the structure diagram of the inner temperature acquisition unit of the vehicle in the invention.
Figure 3:
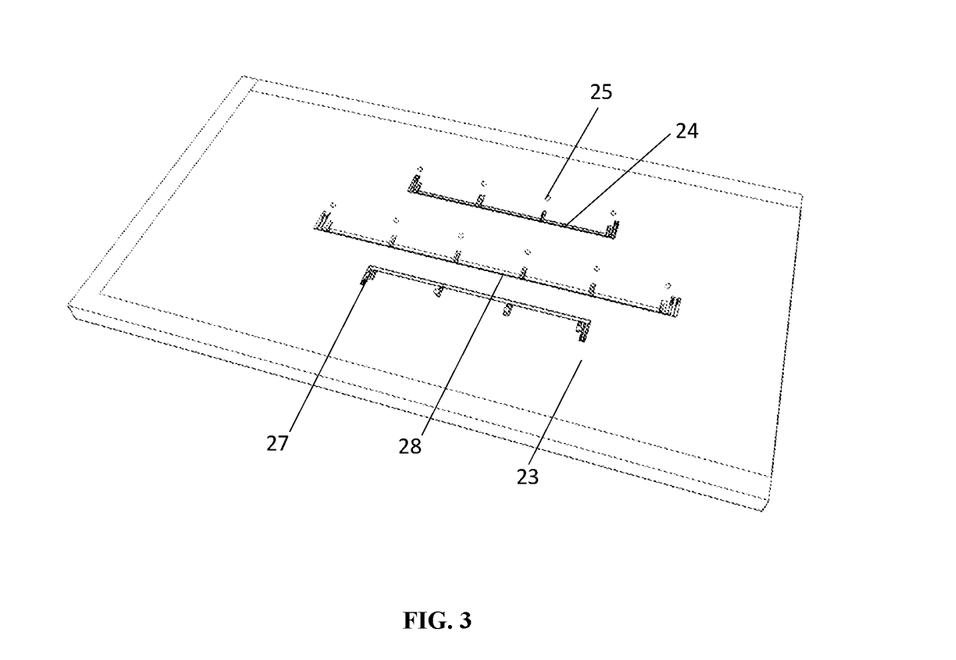
FIG. 3 is the layout of the temperature acquisition unit of the vehicle bottom in the invention.
Figure 4:
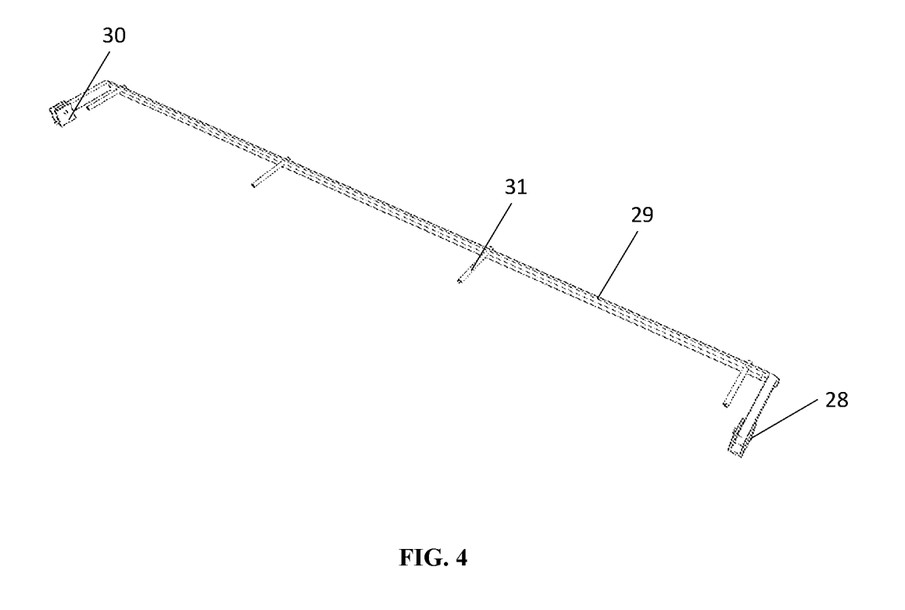
FIG. 4 is the structure diagram of the temperature acquisition unit of the vehicle bottom in the invention.

FIG. 1 is the overall structure diagram of the invention; FIG. 2 is the structure diagram of the inner temperature acquisition unit of the vehicle in the invention; FIG. 3 is the layout of the temperature acquisition unit of the vehicle bottom in the invention; FIG. 4 is the structure diagram of the temperature acquisition unit of vehicle bottom in the invention, as shown in FIGS. 1-4, the structure of the invention includes a fire parameter acquisition device for collecting fire parameters during the fire evolution process of an electric vehicle in a garage, a fire monitoring device for dynamically recording the combustion process, a computer 17, a charging pile 9 and a water gun fire extinguishing mechanism 18, and a fire monitoring device communicates with the computer 17; Fire parameters include heat release rate, temperature, radiation, released gas and mass change of electric vehicle. The garage in this implementation case is a brick garage, which is designed according to the proposal of Garage Building Design Specification Design. It is 6 m in length, 3 m in width, and 3 m in height, and the thickness of the wall is 0.2 m. It can park and test small and micro new energy vehicles.

Among them, the fire parameter acquisition equipment includes a temperature acquisition mechanism around the vehicle, a vehicle radiant heat acquisition mechanism, a vehicle quantity acquisition mechanism 12, and a smoke acquisition mechanism; The fire monitoring equipment includes a vehicle combustion thermal infrared image acquisition mechanism and a vehicle combustion video capture mechanism 2.

Optimal selection of temperature acquisition mechanism around the vehicle includes: the temperature acquisition unit for the roof of vehicle 7, which is installed on the garage side wall above the vehicle; The inner temperature acquisition unit for vehicle 14 is installed inside the vehicle; A temperature acquisition unit at the bottom of the vehicle is installed on the garage floor 23 below the vehicle; The temperature acquisition unit for headstock 4 is installed on the garage side wall of the vehicle head; The temperature acquisition unit for the roof of vehicle 7 and the temperature acquisition unit for headstock 4 are both length adjustable structures; The inner temperature acquisition unit of the vehicle is a fixed structure; The temperature acquisition unit of the vehicle bottom is a rotating adjustable structure.

More specifically, the temperature acquisition unit for the roof of vehicle 7 and the temperature acquisition unit for headstock 4 both include multiple temperature measurement components arranged vertically and linearly on the side wall of the garage, the temperature measurement components are embedded in the wall through holes, which include a telescopic ceramic tube embedded in the inner wall of the garage at one end and a thermocouple pierced through the other end of the telescopic ceramic tube; The telescopic ceramic tube is arranged with one end of the thermocouple extending towards the horizontal center of the electric vehicle in the garage, After the telescopic ceramic tube of the temperature acquisition unit for the roof of vehicle 7 is extended, multiple temperature measurement point for the roof of vehicle 8 arranged in a vertical array can be formed; Similarly, after the expansion ceramic tube of the temperature acquisition unit for headstock 4 is stretched out, a plurality of temperature measurement points for the roof of vehicle arranged in a vertical array can be formed. In this implementation case, the temperature acquisition unit for the roof of vehicle 7 includes seven groups of temperature measurement components arranged from top to bottom, and the temperature acquisition unit for headstock 4 at the head of the vehicle includes six groups of temperature measurement components arranged from top to bottom, the top temperature measurement component is 0.2 m away from the ceiling, and the other temperature measurement components are arranged vertically downward with an interval of 0.2 m, the higher position temperature measurement component can be used to measure the temperature of the flue gas layer, and the lower position temperature measurement component can be selected to shrink to the wall according to the vehicle height.

The optimal selection of the inner temperature acquisition unit for vehicle 14 includes a fixed bracket and a thermocouple arranged on seat 22 of the electric vehicle in the garage, the fixed bracket includes a base arranged on seat 22 and a vertical fixed rod 21 vertically fixed at the top of the base, the vertical fixed rod 21 is provided with multiple positioning connectors 20, one end of the horizontal ceramic tube 19 is fixed on the positioning connectors 20 (by changing the position of the positioning connectors 20 on the vertical fixed rod 21, the height of the horizontal ceramic tube 19 can be changed, which leads the position change of the thermocouple, and then the position change of the temperature acquisition point. At the same time, in this embodiment, the horizontal ceramic tube 19 with different lengths can be customized according to the customer's requirements), and the other end of the horizontal ceramic tube 19 is connected with a thermocouple. The inner temperature acquisition unit for vehicle 14 of this embodiment can be arranged on two seats 22 in front of the vehicle and three seats 22 in the rear of the vehicle. It is suitable for vehicle interior space.

Optimal selection of the temperature acquisition component in middle bottom position 26 arranged in the garage floor 23 groove 15 below the vehicle and a bottom lateral temperature acquisition component in the garage floor 23 groove 15 symmetrically arranged on both sides of the temperature acquisition component in middle bottom position 26, the bottom lateral temperature acquisition component comprises a right temperature acquisition component in vehicle bottom 24 and a bottom left temperature acquisition component 27; The temperature acquisition component in middle bottom position 26 and the bottom side temperature acquisition component both include a U-shaped stent 29 with one end connected to the drive motor through the shaft 28 and an extended ceramic tube 31 with one end fixed in the middle of the U-shaped stent 29, the drive motor is electrically connected to the opening and closing controller 16; The other end of the ceramic tube 31 is connected with a thermocouple; the other end of the U-shaped stent 29 is rotated and connected with the supporting steel groove 30 fixed in the groove 15. The U-shaped stent 29 of the temperature acquisition unit of the vehicle bottom in this implementation case is not suitable for sticking to the groove 15 to prevent tire rolling. In the experiment, the U-shaped stent 29 was placed vertically by driving the motor to rotate 90°. The thermocouple was used to measure the 25 positions of the vehicle temperature measurement point.

Optimal selection of the vehicle radiant heat collection mechanism includes radiant heat flow meters arranged on either side of the electric vehicle and both sides of the front and rear sides, namely, the front radiant heat flow meter 1, the rear radiant heat flow meter 10 and the vehicle side radiant heat flow meter 13, the data of the three radiant heat flow meters can be used to identify the risk of flame radiation igniting surrounding vehicles or combustibles after a fire in a new energy vehicle;

Vehicle quality acquisition mechanism 12 includes four tires for the electric vehicle Mass sensor pads placed on the garage floor 23 for real-time measurement of vehicle mass changes after a fire;

The flue gas collecting mechanism comprises a flue gas velocity acquisition unit 5 and a flue gas component concentration collecting unit. The flue gas velocity acquisition unit 5 comprises a gas velocity sensor arranged on the left and right sides, and the middle position of the garage ceiling respectively; the Smoke component concentration acquisition unit includes a gas analyzer fixed to the top suction pipe 6 of the garage;

The vehicle combustion thermal infrared image acquisition mechanism includes infrared thermal imagers arranged on any side and the front side of the electric vehicle, namely the front infrared thermal imager 3 and the side infrared thermal imager 11; Vehicle side infrared thermal imager 11 is used to measure the temperature change of the garage on the wall, the front infrared thermal imager 3 is used to measure the temperature change of the flame and smoke, etc. in and around electric vehicle body.

Vehicle combustion video capture mechanism 2 includes high-speed cameras on the front side of the electric vehicle to record fire evolution A method based on a fire measuring device of electric vehicles in the garage includes the following steps:

S1, the four mass sensor pads of the vehicle quality acquisition mechanism 12 are placed on the garage floor 23, the electric vehicle is driven into the garage, and make sure the four tires of the electric vehicle are parked on the corresponding four mass sensor pads; Then after determining the experimental conditions, a decision should be made on whether to charge the electric vehicle to a fixed amount of electricity or let the electric vehicle in a charging state according to the experimental conditions; In step S1, if it is necessary to charge to a fixed amount of electricity, the vehicle plug of the AC charging connection device should be disconnected first when stopping charging, and then the power supply plug at the power supply end should be disconnected.

S2, the telescopic ceramic tubes of the temperature acquisition unit for the roof of vehicle 7 and the temperature acquisition unit for the headstock are elongated according to the height of the vehicle, and then the height of the ceramic tube 31 of the inner temperature acquisition unit of the vehicle on the seat 22 is adjusted according to the position of the measuring point, then, the switching controller 16 is used to make the U-shaped stent 29 at the bottom of the vehicle in a vertical state, the thermocouple test software is opened to check whether all thermocouples are in normal operation, after replacing the thermocouple in an abnormal state, the newly installed thermocouple is repeatedly detected until all thermocouples are in normal operation and close the thermocouple test software;

S3, adjust the position of the infrared thermal imager, the high-speed camera, and the radiant heat flow meters respectively according to the position of the vehicle, and then turn on the computer 17, the infrared thermal imager, the high-speed camera, the radiant heat flow meters, the gas flow rate sensor, the gas analyzer and the switching controller 16 to check whether each part of the device is in a normal state, and calibrate the sensor that needs to be calibrated, then turn on the computer 17 to match each part of the test analysis software to test whether each part is in a normal working state, if otherwise, debug and repair, if so, enter the next step;

S4, ignite electric vehicles and record the fire process temperature, infrared images, video images, radiation heat flow, gas flow rate, gas composition, and gas concentration in real-time; It should be noted that the firing process uses fire boards, fire cotton, and other materials to protect the charging pile 9. After the vehicle fire is over, turn off the infrared thermal imager, high-speed camera, radiation heat flow meter, and test and analysis software;

S5, after finishing the test, water gun fire extinguishing mechanism 18 is used to cool the vehicle body to prevent re-ignition and clear fire residue out of the garage; recycle the inner temperature acquisition unit for vehicle 14 on the seat 22 for subsequent use; At the same time, the telescopic ceramic tube of the temperature acquisition unit for the roof of vehicle 7 and the temperature acquisition unit for headstock 4 is contracted back to the interior of the garage wall; Using the switching controller 16 to collect the vehicle bottom temperature acquisition unit in the garage floor 23 grooves 15;

S6, export and analyze the experimental data on the computer 17, that is, the heat release rate of the electric vehicle is calculated according to the thickness of the flue gas layer recorded by the high-speed camera, the flue gas velocity recorded by the gas flow meter, and the concentration of oxygen, carbon monoxide and carbon dioxide recorded by the gas analyzer; At the same time, the risk of electric vehicles igniting surrounding cars and combustibles can be judged according to the data of radiation heat flow meter, the temperature change of each point in the fire development process and fire process can be judged according to the data of thermocouple and infrared thermal imager;

Optimal selection in step S6, the height of the smoke layer captured by the high-speed camera is defined as h. The flow rates of the left and right sides of the garage ceiling and the middle smoke layer measured by the gas flow meter are $u_1$, $u_2$, and 113, respectively. The oxygen concentration collected by the gas analyzer before the fire is defined as $\dot{X}_{O2}{}^0$, the real-time concentration of oxygen during the firing process is defined as $\dot{X}_{O2}$. Based on the oxygen consumption method, the heat release rate $\dot{Q}$ during the combustion process of the car is estimated as:

$$\dot{Q} = E \frac{32h(u_1 + u_2 + u_3)\left(\dot{X}_{O2}^0 - \dot{X}_{O2}\right)}{V_m}$$

Whereas the molar volume of oxygen is $V_m$ and E is the heat released per unit mass of oxygen consumed, averaging 13.1 MJ/kg.

S7, by changing the fire ignition mode (Including electrical short circuit fault caused fire, battery failure caused fire, standard fire source ignition, front bumper ignition, etc.), vehicle type, charging capacity, charging state and whether using the water gun fire during the fire evolution process, repeat steps S1 to S6 to determine the different scenarios of electric vehicle fire evolution and fire risk.

Based on the use of an electric vehicle fire measurement device in the garage, it is used for simulation, fire risk assessment, practical engineering guidance, or standard formulation.

Therefore, the invention adopts a fire measuring device of an electric vehicle in the garage with the above-mentioned structure, which can measure and record the temperature, infrared image, video image, radiation heat flow, gas flow rate, gas type, and gas concentration in the fire evolution process and provide basic data for the evolution rule and simulation of the electric vehicle in the garage, in the aspect of engineering application, it can provide support for the fire investigation of the electric vehicle, the standard design of the garage and the optimal design of the new energy vehicle, and make up for the device blank in the fire test field of the electric vehicle in the garage.

Finally, it should be noted that the above implementation embodiment is only used to explain the technical scheme of the invention rather than to restrict it. Although the invention is described in detail regarding the better implementation embodiment, ordinary technicians in this field should understand that they can still modify or replace the technical scheme of the invention, and these modifications or equivalent replacements cannot make the modified technical scheme out of the spirit and scope of the technical scheme of the invention.

What is claimed is:

1. A fire measuring device for an electric vehicle in a garage, comprising a fire parameter acquisition device for collecting fire parameters during a fire evolution process of the electric vehicle in the garage, a fire monitoring device for dynamically recording a combustion process, a computer, a charging pile, and a water gun fire extinguishing mechanism, wherein the fire monitoring device communicates with the computer; and wherein the fire parameters comprises a heat release rate, a temperature, a radiation, a released gas, and an electric vehicle mass change.

2. The fire measuring device for the electric vehicle in the garage according to claim 1, wherein the fire parameter acquisition device comprises a temperature acquisition mechanism around the electric vehicle, a vehicle radiation heat acquisition mechanism, a vehicle mass acquisition mechanism, and a smoke acquisition mechanism; and wherein the fire monitoring device comprises a vehicle combustion heat infrared image acquisition mechanism and a vehicle combustion video acquisition mechanism.

3. The fire measuring device for the electric vehicle in the garage according to claim 2, wherein the temperature acquisition mechanism around the electric vehicle comprises:

a temperature acquisition unit for a roof of the electric vehicle, the temperature acquisition unit for the roof of the electric vehicle being installed on a garage sidewall above the electric vehicle;

an inner temperature acquisition unit of the electric vehicle, the inner temperature acquisition unit of the electric vehicle being installed inside the electric vehicle;

a temperature acquisition unit for a bottom of the electric vehicle, the temperature acquisition unit for the bottom of the electric vehicle being installed on a garage floor under the electric vehicle; and a temperature acquisition unit for a headstock, the temperature acquisition unit for the headstock being installed on the garage sidewall near the headstock;

wherein the temperature acquisition units for the roof of the electric vehicle and the temperature acquisition unit for the headstock are both a length-adjustable structure;

wherein the inner temperature acquisition unit of the electric vehicle is a fixed structure; and wherein the temperature acquisition unit for the bottom of the electric vehicle is a rotating adjustable structure.

4. The fire measuring device for the electric vehicle in the garage according to claim 3, wherein the temperature acquisition unit for the roof of the electric vehicle and the temperature acquisition unit for the headstock both comprise multiple temperature measurement components arranged vertically, linearly, uniformly on the garage sidewall, the multiple temperature measurement components comprise a telescopic ceramic tube with an end embedded in an inner wall of the garage and a thermocouple piercing through an other end of the telescopic ceramic tube; and wherein the other end with the thermocouple of the telescopic ceramic tube extends toward a horizontal center of the electric vehicle in the garage.

5. The fire measuring device for the electric vehicle in the garage according to claim 3, wherein the inner temperature acquisition unit of the electric vehicle comprises a fixed bracket and a thermocouple arranged on a seat of the electric vehicle in the garage, the fixed bracket comprises a base arranged on the seat and a vertical fixing rod vertically fixed at a top of the base, a plurality of positioning joints are arranged on the vertical fixing rod, an end of a horizontal ceramic tube is fixed on each of the plurality of positioning joints, and an other end of the horizontal ceramic tube is connected with the thermocouple.

6. The fire measuring device for the electric vehicle in the garage according to claim 3, wherein the temperature acquisition unit for the bottom of the electric vehicle comprises a bottom intermediate temperature collecting component arranged in a first garage floor groove under the electric vehicle and a bottom lateral temperature collecting component arranged symmetrically in a second garage floor groove on both sides of the bottom intermediate temperature collecting component;
   wherein the bottom intermediate temperature collecting component and the bottom lateral temperature collecting component both comprise a U-shaped bracket with an end connected with a driving motor through a rotating shaft and an extended ceramic tube with an end fixed in a middle of the U-shaped bracket, and the driving motor is electrically connected with an opening and closing controller;
   wherein an other end of the extended ceramic tube is connected to a thermocouple; and
   wherein an other end of the U-shaped bracket is rotationally connected with a supporting steel groove fixed in a groove.

7. The fire measuring device for the electric vehicle in the garage according to claim 2, wherein a vehicle radiant heat collecting mechanism comprises radiant heat flow meters, the radiant heat flow meters corresponding to an either side of a right side and a left side of the electric vehicle and both a front side and a rear side and arranged on the either side of the right side and the left side of the electric vehicle and both the front side and the rear side;
   the vehicle mass acquisition mechanism comprises a mass sensor mat, the mass sensor mat corresponding to four tires of the electric vehicle and arranged on a garage floor;
   a flue gas collection mechanism comprises a flue gas flow rate collection unit and a flue gas component concentration collection unit, the flue gas flow rate collection unit comprises a gas flow rate sensor arranged on a left side, a right side, and a middle position of a ceiling of the garage, the flue gas component concentration collection unit comprises a gas analyzer fixed in an exhaust pipe at a top of the garage;
   the vehicle combustion heat infrared image acquisition mechanism comprises an infrared thermal imager, the infrared thermal imager corresponding to an any side of the right side, the left side, and the front side of the electric vehicle and arranged on the any side of the right side, the left side, and the front side of the electric vehicle; and
   the vehicle combustion video acquisition mechanism comprises a high-speed camera, the high-speed camera corresponding to the front side of the electric vehicle and arranged to the front side of the electric vehicle.

8. A method of using a fire measuring device for an electric vehicle in a garage, comprising the following steps:
   S1, placing four mass sensor pads of a vehicle mass acquisition mechanism on a garage floor, wherein the four mass sensor pads correspond to four tires of the electric vehicle; driving the electric vehicle into the garage, and making the four tires of the electric vehicle park on the four mass sensor pads; then after determining experimental conditions, deciding charging the electric vehicle to a fixed amount of an electricity or letting the electric vehicle in a charging state according to the experimental conditions;
   S2, elongating a first telescopic ceramic tube of a first temperature acquisition unit at a roof of the electric vehicle and a second telescopic ceramic tube of a second temperature acquisition unit at a headstock of the electric vehicle according to a height of the electric vehicle, and then adjusting a height of a third telescopic ceramic tube of a third temperature acquisition unit inside the electric vehicle on a seat according to a position of a measuring point, using a opening and closing controller to make an U-shaped bracket at a bottom of the electric vehicle in a vertical state, and opening a thermocouple test software to check whether all thermocouples are in a normal operation, after replacing any thermocouple in an abnormal state, repeatedly checking any newly installed thermocouple until all newly installed thermocouples are in the normal operation and closing the thermocouple test software;
   S3, adjusting a position of an infrared thermal imager, a position of a high-speed camera, and a position of a radiation heat flow meter respectively according to a position of the electric vehicle, and then turning on a computer, the infrared thermal imager, the high-speed camera, the radiation heat flow meter, gas flow rate sensors, a gas analyzer, and the opening and closing controller to check whether each part of the fire measuring device is in a normal state, and calibrating the gas flow rate sensors in need of being calibrated, and then turning on a test and analysis software matching the each part in the computer to test whether the each part is in a normal working state; if the each part is not in the normal working state, conducting debugging and repairing; if the each part is in the normal working state, conducting a next step;
   S4, igniting the electric vehicle and recording a fire process temperature, infrared images, video images, a radiation heat flow, a gas flow rate, a gas composition, and a gas concentration in real-time;
   S5, after finishing the testing, using a water gun fire extinguishing mechanism to cool a body of the electric vehicle to prevent a re-ignition and clear a fire residue out of the garage; recycling the third temperature acquisition unit inside the electric vehicle on the seat for a subsequent use; at the same time, contracting the first telescopic ceramic tube of the first temperature acquisition unit at the roof of the electric vehicle and the second telescopic ceramic tube of the second temperature acquisition unit at the headstock of the electric vehicle back to an interior of a garage wall; using the opening and closing controller to collect a temperature acquisition unit for the bottom of the electric vehicle in a garage floor groove;
   S6, exporting experimental data to the computer and analyzing the experimental data by the computer, i.e., calculating a heat release rate of the electric vehicle according to a thickness of a flue gas layer recorded by the high-speed camera, a flue gas velocity recorded by a gas flow meter, and a concentration of oxygen, a concentration of carbon monoxide, and a concentration of carbon dioxide recorded by the gas analyzer; at the same time, judging a risk of the electric vehicle igniting surrounding cars and combustibles according to data of the radiation heat flow meter, judging a temperature change of each point in a fire development process and a fire process according to data of the thermocouples and data of the infrared thermal imager; and S7, by changing a fire ignition mode, a vehicle type, a charging capacity, a charging state, and whether using a water gun fire during a fire evolution process, repeating the steps S1 to S6 to determine a fire evolution pattern and a fire risk of the electric vehicle under different scenarios.

9. The method of using the fire measuring device for the electric vehicle in the garage according to claim 8, wherein in the step S6, the height of the flue gas layer captured by the high-speed camera is defined as h; flow rates of the flue gas layer at a left side, a right side, and a middle of a ceiling of the garage measured by the gas flow meter are $u_1$, $u_2$, and $u_3$, respectively; an oxygen concentration collected by the gas analyzer before a fire is defined as $\dot{X}_{O2}^0$, a real-time concentration of the oxygen during a firing process is defined as $\dot{X}_{O2}$; based on an oxygen consumption method, the heat release rate $\dot{Q}$ during a combustion process of the electric vehicle is estimated as:

$$\dot{Q} = E \frac{32h(u_1 + u_2 + u_3)\left(\dot{X}_{O2}^0 - \dot{X}_{O2}\right)}{V_m}$$

wherein $V_m$ is a molar volume of the oxygen, and E is a heat released per unit mass of the oxygen consumed, averaging 13.1 MJ/kg.

* * * * *